United States Patent [19]
Asai et al.

[11] Patent Number: 5,244,975
[45] Date of Patent: Sep. 14, 1993

[54] AROMATIC POLYSULFONE RESIN COMPOSITIONS

[75] Inventors: Kuniaki Asai, Tondabayashi; Tadayasu Kobayashi; Mituo Maeda, both of Tsukuba, all of Japan

[73] Assignee: Sumitomo Chemical Company, Limited, Osaka, Japan

[21] Appl. No.: 661,233

[22] Filed: Feb. 27, 1991

[30] Foreign Application Priority Data

Feb. 28, 1990 [JP] Japan .................................. 2-50090

[51] Int. Cl.$^5$ .............................................. C08L 81/06
[52] U.S. Cl. ...................................... 525/189; 525/537
[58] Field of Search ........................... 525/189, 537

[56] References Cited

U.S. PATENT DOCUMENTS

| | | |
|---|---|---|
| Re. 31,448 | 11/1983 | Attwood et al. |
| 3,981,945 | 9/1976 | Attwood et al. |
| 4,477,630 | 10/1984 | Saito et al. ............................ 525/189 |
| 4,897,439 | 1/1990 | Rau et al. ............................. 525/189 |

FOREIGN PATENT DOCUMENTS

| | | |
|---|---|---|
| 0112196 | 10/1983 | European Pat. Off. |
| 0106764 | 4/1984 | European Pat. Off. |
| 0089206 | 9/1987 | European Pat. Off. |
| 0132094 | 9/1987 | European Pat. Off. |
| 0356948 | 8/1989 | European Pat. Off. |
| 60-38465 | 2/1985 | Japan. |

*Primary Examiner*—Melvyn I. Marquis
*Assistant Examiner*—Helen F. Lee
*Attorney, Agent, or Firm*—Stevens, Davis, Miller & Mosher

[57] ABSTRACT

An aromatic polysulfone resin composition improved in dispersibility of fluorocarbon polymer comprising 0.3 to 50 parts by weight of a low molecular weight fluorocarbon polymer fluorinated up to its molecular end, having a flow temperature of 350° C. or lower as measured by the following method, and 100 parts by weight of an aromatic polysulfone resin:

Flow temperature: A temperature at which melt viscosity reaches 48,000 poises when a molten sample is extruded from a nozzle (1 mm in inner diameter and 10 mm in length) of a capillary rheometer under a load of 100 kg/cm$^2$ at a temperature elevation speed of 4° C./minute.

5 Claims, No Drawings

AROMATIC POLYSULFONE RESIN COMPOSITIONS

BACKGROUND OF THE INVENTION

1. Field of the Invention

This invention relates to an aromatic polysulfone resin composition which is improved in the dispersibility of fluorocarbon polymer in the aromatic polysulfone matrix comprising a specified fluorocarbon polymer and an aromatic polysulfone resin. More particularly, this invention relates to an aromatic polysulfone resin composition improved in appearance, mechanical strength, sliding characteristics, moldability, etc. of molded product.

2. Description of the Prior Art

Since aromatic polysulfone resin is amorphous, it has isotropy and is small in mold shrinkage. Further, since it is higher in glass transition point than high heat resistance resins such as polyphenylene sulfide and polyether-ketone, it retains smaller extents of deterioration in strength, modulus of elasticity, creep resistance, etc. up to a higher temperature as compared with these resins. Thus, aromatic polysulfone resin is successfully usable as a material of electronic parts and parts of OA, AV instruments which must have a high dimensional accuracy and a high heat resistance.

A composition prepared by adding a fluorocarbon polymer, preferably polytetrafluorethylene, to an aromatic polysulfone resin has a self-lubricating property in addition to the above-mentioned properties, and therefore it is improved in mold release characteristics from mold and sliding characteristics, as is well known.

Further, it is mentioned in Japanese Patent Application Kokai (Laid-Open) No. 60-23448 that, in case of aromatic polysulfone resin compositions containing a fibrous reinforcing material such as glass fiber, potassium titanate fiber, wollastonite and the like or containing an inorganic filler such as talc, calcium carbonate, glass beads and the like, mold shrinkage of the composition is reduced and therefore mold release characteristics of such compositions from mold can be remarkably improved by adding a fluorocarbon polymer to them. Further, regarding sliding characteristics, it is mentioned in Japanese Patent Kokai (Laid-Open) No. 60-38465 that a composition comprising an aromatic polysulfone, a fluorocarbon polymer and carbon fiber is excellent in wear characteristics and brings about an improvement in bearing life when used as an oilless bearing. Further, it is mentioned in Japanese Patent Kokai (Laid-Open) No. 58-160353 that, when a composition comprising an aromatic polysulfone, a fluorocarbon polymer and oxybenzoyl polyester is used as an oilless bearing, the bearing has excellent wear characteristics and an improved bearing life and, in addition, it does not injure the opposite material even if the latter is made of a soft metal such as aluminum, SUS and the like.

Although the fluorocarbon polymer used in the above-mentioned compositions, particularly polytetrafluorethylenes represented by Fluon® L169J and L170J manufactured by Asahi Glass Fiber Co. or Lublon® L-2 and L-5 manufactured by Daikin Industries, Ltd. have a melting point ranging from 325° C. to 330° C., their molten products have a very high melt viscosity or are hardly flowable at the molding temperature of aromatic polysulfone resin (350° C. or above). Accordingly, if an aromatic polysulfone resin is mixed with such a fluorocarbon polymer and molded by extrusion or injection, the fluorocarbon polymer is aggregated by the shearing action and its dispersibility in the aromatic polysulfone matrix is much deteriorated. Thus, the molded product is inferior in appearance and low in mechanical strength. Further, this type of compositions are waiting for an additional improvement in sliding characteristics.

SUMMARY OF THE INVENTION

It is the object of this invention to provide an aromatic polysulfone resin composition improved in the dispersibility of fluorocarbon polymer in the aromatic polysulfone matrix and thereby capable of solving the above-mentioned problems.

With the aim of solving the problems mentioned above, the present inventors conducted many studies to find that the above-mentioned object can be achieved by incorporating a specified fluorocarbon polymer into an aromatic polysulfone resin. Based on the finding, this invention was accomplished.

Thus, this invention provides an aromatic polysulfone resin composition comprising 0.3 to 50 parts by weight of a low molecular weight fluorocarbon polymer fluorinated up to its molecular end, having a flow temperature of 350° C. or lower as measured by the following method and 100 parts by weight of an aromatic polysulfone resin, which is improved in the dispersibility of the fluorocarbon polymer in the aromatic polysulfone matrix.

Flow temperature: A temperature at which the melt viscosity reaches 48,000 poises when a molten sample is extruded from a nozzle (1 mm in inner diameter and 10 mm in length) of a capillary rheometer under a load of 100 kg/cm$^2$ at a temperature elevation speed of 4° C./minute.

It has been found that, by improving the dispersibility of fluorocarbon polymer, surface appearance, mechanical strength and sliding characteristics of composition are improved and mold release characteristics of the composition from mold becomes excellent. Further, it was also found that such a composition is lower in melt viscosity and improved in moldability as compared with aromatic polysulfone resin compositions containing usual fluorocarbon polymer, without deterioration in heat stability in the molten stat and thermal properties of molded product.

DETAILED DESCRIPTION OF THE INVENTION

The aromatic polysulfone resin used in this invention is defined as a polyarylene compound in which arylene units are orderly or disorderly located together with ether bonds and sulfone bonds. As typical examples of the aromatic polysulfone resin of this invention, those having the following recurring units can be referred to:

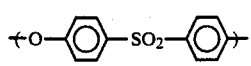
(1)

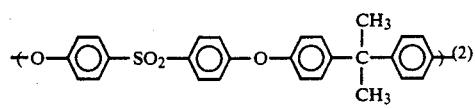
(2)

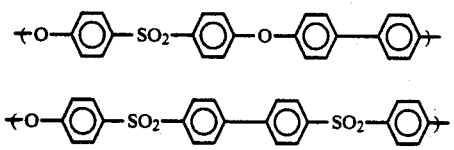

(3)

(4)

Among them, those having the recurring structural unit (1) and those having the recurring structural unit (2) are preferred. Those having unit (1) are marketed by ICI Co. under the trade name of VICTREX® PES3600P, 4100P and 4800P. Those having unit (2) are marketed by AMOCO Co. under the trade name of UDEL ® P-1700. Among them, aromatic polysulfone resins having the recurring structural unit (1) are particularly preferable.

The specified fluorocarbon polymer used in this invention is a fluorocarbon polymer fluorinated up to its molecular end, having a flow temperature of 350° C. or lower as measured by the method defined above. Its fundamental skeleton contains polytetrafluorethylene (hereinafter simply referred to as PTFE), tetrafluorethylene-hexafluoropropylene copolymer, polytrichlorofluorethylene, tetrafluoroethyleneperfluoroalkyl vinyl ether copolymer and the like, among which PTFE is particularly preferable. The fluorocarbon polymer is produced by reacting a fluorine-containing polymer with a nitrogen-containing fluorine compound at 250° C. to 550° C. as mentioned in Japanese Patent Application Kokai (Laid-Open) No. 61-118331 and Japanese Patent Application Kokai (Laid-Open) No. 61-162503, or by reacting a fluorine-containing polymer with at least one member selected from molecular fluorine, a halogenated fluoride and a rare gas fluoride. Products of which fundamental skeleton is PTFE are marketed by Central Glass Fiber Co. under the trade name of Cefral lube ® I and IP.

In this invention, the content of the fluorocarbon polymer is preferably 0.3 to 50 parts by weight per 100 parts by weight of aromatic polysulfone resin, and the content may be varied within this range in accordance with the purpose. More preferably, its content is 0.5 to 40 parts by weight. If the content of the fluorocarbon polymer is lower than 0.3 part by weight, the addition of the fluorocarbon polymer brings about no noticeable effect on mold release characteristics and sliding characteristics. If it exceeds 50 parts by weight, mechanical strength is deteriorated.

If desired, a fibrous reinforcing material such as glass fiber, ceramic fiber, silica-alumina fiber, alumina fiber, wollastonite, carbon fiber, potassium titanate fiber, aramide fiber and the like; an inorganic filler such as calcium carbonate, talc, mica, clay, glass beads and the like; a solid lubricant such as graphite, molybdenum disulfide and the like; a heat resistant resin such as oxybenzoyl polyester, polyimide and the like; a colorant such as dye, pigment and the like; an electrically conductive carbon, and the like may be added to the composition of this invention.

It is also allowable to add, to the composition of this invention, at least one member selected from the group consisting of thermoplastic resins such as polyethylene, polypropylene, polyamide, polyester, polycarbonate, modified polyphenylene oxide, polyphenylene sulfide, polyether-imide, polyether-ketone, polyamide-imide and the like and thermosetting resins such as phenolic resin, epoxy resin, polyimide and the like, unless their addition causes an adverse influence on the object of this invention.

The means for compounding the starting ingredients for the purpose of obtaining a molding material of this invention is not critical. A general procedure for this purpose comprises mixing together an aromatic polysulfone resin, a fluorocarbon polymer and optionally an fibrous reinforcing material such as glass fiber and the like, an inorganic filler such as talc and the like and a heat resistant resin such as oxybenzoyl polyester and the like by means of Henschel mixer, tumbler or the like and thereafter melting and kneading the resulting mixture by means of an extruder.

If a low molecular weight fluorocarbon polymer fluorinated up to its molecular end, having a flow temperature of 350° C. or lower is incorporated into an aromatic polysulfone resin composition, dispersibility of the fluorocarbon polymer in the aromatic polysulfone matrix is improved. This is for the reason that, since the fluorinated resin is completely melted at the melting temperature of the aromatic polysulfone and since the fluorinated resin is fluorinated up to its molecular end, it is not decomposed thermally in spite of its low molecular weight.

In the aromatic polysulfone resin composition of this invention, dispersibility of the fluorocarbon polymer in the aromatic polysulfone matrix is improved as compared with in compositions using prior fluorocarbon polymers. That is, the dispersed fluorocarbon polymer has a smaller particle diameter in the composition of this invention than in the prior compositions. Accordingly, the composition of this invention is excellent in appearance, mechanical strength and sliding characteristics of molded product and in moldability. Thus, it is quite useful as a material for electronic parts, parts of OA, AV instruments, and the like.

Next, examples of this invention will be mentioned below. This invention is by no means limited by these examples. The characteristic properties mentioned in the examples were measured by the following methods.

Characteristic Properties of Fluorocarbon Polymer

Flow temperature: A temperature at which melt viscosity reaches 48,000 poises when a molten sample is extruded from a nozzle (1 mm in inner diameter and 10 mm in length) under a load of 100 kg/cm$^2$ at a temperature elevation speed of 4° C./minute by the use of KOKASHIKI Flow Tester Model CFT-500 manufactured by Shimadzu Corporation is taken as flow temperature. A resin having a lower flow temperature is greater in fluidity.

Melting point: Ten milligrams of a sample is heated in an atmosphere of nitrogen gas at a temperature elevation speed of 10° C./minute up to 400° C. by the use of Scanning Differential Calorimeter Model DSC-50 manufactured by Shimadzu Corporation to measure the endotherm peak, from which melting point is evaluated.

Characteristics of Aromatic Polysulfone Resin Composition

Dispersibility of fluorocarbon polymer and appearance of molded product: A composition of this invention is formed into dampbells for tensile test (ASTM No. 4) by the use of an injection molding machine (SYCAP N110/45 manufactured by Sumitomo Heavy Industries, Ltd.) at a cylinder temperature of 350°–360° C. at a mold temperature of 150° C. The surface of the neck part is visually examined. Further, F-Kα ray image is taken by the use of EPMA apparatus Model JXA8600 M manufactured by Nippon Denshi Co. at an accelerating voltage of 15 KV, at an irradiating current of 30 mA, at a magnification of 200, from which diameter of the dispersed PTFE particles is determined.

Tensile strength: Using the tensile dampbells mentioned above, tensile strength is measured according to ASTM D638.

Izod impact strength (unnotched): Test pieces for bending having a length of 127 mm, a width of 12.7 mm and a thickness of 6.4 mm are formed under the same conditions as in the case of tensile dampbells, and each test piece is divided into two equal moieties in the longitudinal direction. Each moiety thus obtained is used as a test piece for measurement of unnotched Izod impact strength according to ASTM D256.

Heat distortion temperature: Using the test pieces for bending mentioned above, heat distortion temperature is measured according to ASTM D648.

Mold release characteristics from mold: A composition of this invention is formed into a cylindrical bush having an inner diameter of 11 mm, an outer diameter of 15 mm and a height of 15 mm by the use of an injection molding machine (SYCAP N110/45, manufactured by Sumitomo Heavy Industries, Ltd.) at a cylinder temperature of 350° C. and a mold temperature of 150° C., and the mold release resistance at the time of releasing from mold is detected by means of a pressure sensor provided on the ejector pin. Taking a sample containing no fluorocarbon polymer as a standard (100%), mold release resistance of the composition of this invention is represented by %.

Sliding characteristics: A wear ring having an outer diameter of 25.6 mm, an inner diameter of 20 mm and a height of 15 mm is formed under the same conditions as in the case of tensile dampbells. Using Suzuki Wear Tester, it is slidden for 48 hours on an opposite material (SUS 304) under a pressure of 6 kg/cm$^2$ at a speed V of 40 m/minute to determine friction coefficient $\mu$ and an amount of wear.

Moldability and heat stability in the molten state: Using the same apparatus and nozzle as in the paragraph concerning the measurement of flow temperature, a sample is made to reside in the cylinder under a load of 50 kg/cm$^2$ at 400° C. for a period of 5 minutes in one run and 30 minutes in another run, and then extruded, respectively. The melt viscosity at this time is taken as a measure of moldability and heat stability in the molten state.

EXAMPLE 1

One hundred parts by weight of an aromatic polysulfone resin powder (VICTREX ® PES4100P, manufactured by ICI Co.) was mixed with 11 parts by weight of a PTFE fluorinated up to the molecular end, having a flow temperature of 344° C. and a melting point of 323° C. as measured by the above-mentioned methods (Cefral lube ® IP, manufactured by Central Glass Fiber Co.) in Henschel mixer, and the mixture was extruded from a twin-screw extruder (PCM30, manufactured by Ikegai Iron Works, Ltd.) at a cylinder temperature of 340° C. to obtain a pelletized aromatic polysulfone resin composition. Using the pellet, moldability and heat stability in the molten state were measured. Further, it was injection molded in the above-mentioned manner and dispersibility of fluorocarbon polymer and appearance, Izod impact strength, heat distortion temperature and sliding characteristics of the molded product were measured. The results are listed in Table 1.

COMPARATIVE EXAMPLE 1

The procedure of Example 1 was repeated, except that a PTFE not flowing even at a temperature of 380° C. and having a melting point of 326° C. (Fluon ® L169J, manufactured by Asahi Glass Fiber Co.) was used as said fluorocarbon polymer. The results are listed in Table 1.

It is apparent from Table 1 that the composition of this invention using the specified fluorocarbon polymer is improved in dispersibility of fluorocarbon polymer, namely small in the diameter of dispersed particles, and therefore excellent in appearance, Izod impact strength and sliding characteristics of molded product, and further it is excellent in moldability owing to its low melt viscosity, without deterioration in heat distortion temperature and heat stability in the molten state.

EXAMPLE 2

One hundred parts by weight of aromatic polysulfone resin powder (VICTREX ® PES4100P, manufactured by ICI Co.), 33 parts by weight of a PTFE fluorinated up to its molecular end, having a flow temperature of 344° C. and a melting point of 323° C. as measured by the above-mentioned methods (Cefral lube ® IP, manufactured by Central Glass Fiber Co.) and 33 parts by weight of oxybenzoyl polyester having an average particle diameter of about 15 $\mu$m (ECONOL ® E101S, manufactured by Sumitomo Chemical Co., Ltd.) were mixed together by means of Henschel mixer, and the resulting mixture was pelletized in the same manner as in Example 1. The pellet was injection molded to obtain test pieces. Using the pellet and the injection molded test pieces, the same tests as in Example 1 were conducted to obtain the results listed in Table 2.

COMPARATIVE EXAMPLE 2

The procedure of Example 2 was repeated, except that the same PTFE as used in Comparative Example 1 (Fluon ® L169J manufactured by Asahi Glass Fiber Co.) was used as the fluorocarbon polymer. The results are listed in Table 2.

It is apparent from Table 2 that the composition of this invention using the specified fluorocarbon polymer of this invention is improved in the dispersibility of fluorocarbon polymer, namely small in the diameter of dispersed fluorocarbon polymer particles and improved in appearance, Izod impact strength and sliding characteristics of molded product and, in addition, excellent in moldability owing to its low melt viscosity, without deterioration in heat distortion temperature and heat stability in the molten state.

EXAMPLE 3

After mixing together 100 parts by weight of aromatic polysulfone resin powder (VICTREX ® PES3600P, manufactured by ICI Co.), 50 parts by weight of chopped glass fiber (CS03MAPX1, manufactured by Asahi Glass Fiber Co.) and 17 parts by weight of a PTFE fluorinated up to its molecular end, having a flow temperature of 330° C. and a melting point of 318° C. as measured by the above-mentioned methods (Cefral lube ® I, manufactured by Central Glass Fiber Co.) as a fluorocarbon polymer by means of Henschel mixer, the resulting mixture was pelletized and injection molded in the same manner as in Example 1. Using the pellet, moldability and heat stability in the molten state were evaluated. Using the injection molded product, dispersibility of fluorocarbon polymer and appearance, tensile strength, Izod impact strength and heat distortion temperature of molded product were measured. The results are listed in Table 3.

COMPARATIVE EXAMPLE 3

The procedure of Example 3 were repeated, except that the same PTFE as used in Comparative Example 1 (Fluon® L169J, manufactured by Asahi Glass Fiber Co.) was used as the fluorocarbon polymer. The results are listed in Table 3.

It is apparent from Table 3 that the composition of this invention using the specified fluorocarbon polymer of this invention is remarkably improved in the dispersibility of fluorocarbon polymer, namely remarkably small in the diameter of dispersed fluorocarbon polymer particles, and improved in appearance, tensile strength and Izod impact strength of molded product and, in addition, improved in moldability owing to its low melt viscosity, without deterioration in heat distortion temperature and heat stability in the molten state.

EXAMPLE 4 AND 5 AND COMPARATIVE EXAMPLES 4 AND 5

A composition of Comparative Example 4 was prepared by compounding 100 parts by weight of aromatic polysulfone resin powder (VICTREX® PES3600P, manufactured by ICI Co.) with 25 parts by weight of chopped glass fiber (CS03MAPX1, manufactured by Asahi Glass Fiber Co.). Further, compositions of Example 4, Example 5 and Comparative Example 5 were prepared by compounding the composition of Comparative Example 4 with 0.5, 1.0 and 0.1 part by weight, respectively, of the same PTFE as used in Example 3 (Cefral lube® I, manufactured by Central Glass Fiber Co.). On each of the compositions thus prepared, dispersibility of fluorocarbon polymer and tensile strength and heat distortion temperature of molded product were measured in the same manner as in Example 3. Further mold release characteristics from mold was measured according to the same method as mentioned above. The results are listed in Table 4.

It is apparent from Table 4 that compositions of this invention containing more than 0.3 part by weight of the specified fluorocarbon polymer of this invention (compositions of Example 4 and Example 5) are excellent in mold release characteristics from mold. Regarding the composition containing less than 0.3% by weight of fluorocarbon polymer (composition of Comparative Example 5), its mold release characteristics was comparable to that of a composition containing no fluorocarbon polymer (composition of Comparative Example 4).

TABLE 1

| | Aromatic polysulfone resin (parts by wt.) | Fluorocarbon polymer (parts by wt.) | Dispersibility of fluorocarbon polymer Diameter of dispersed particle (μm) | Appearance of molded product | Izod impact strength (kg·cm/cm) | Heat distortion temperature (°C.) | Sliding characteristics Friction coefficient μ | Amount of wear ΔW (mg) | Moldability and heat stability in molten state Melt viscosity After residence for 5 min. (poises) | After residence for 30 min. (poises) |
|---|---|---|---|---|---|---|---|---|---|---|
| Example 1 | VICTREX® PES4100P 100 | Cefral lube® IP 11 | 30–50 | Nearly uniform | 113 | 209 | 0.11 | 22 | 2,300 | 2,900 |
| Comparative Example 1 | VICTREX® PES4100P 100 | Fluon® L169J 11 | 100–150 | White spots marked | 61 | 212 | 0.21 | 37 | 2,900 | 3,300 |

TABLE 2

| | Aromatic polysulfone resin (parts by wt.) | Fluorocarbon polymer (parts by wt.) | Oxybenzoyl polyester (parts by wt.) | Dispersibility of fluorocarbon polymer Diameter of dispersed particle (μm) | Appearance of molded product | Izod impact strength (kg·cm/cm) | Heat distortion temperature (°C.) | Sliding characteristics Friction coefficient μ | Amount of wear ΔW (mg) | Moldability and heat stability in molten state Melt viscosity After residence for 5 min. (poises) | After residence for 30 min. (poises) |
|---|---|---|---|---|---|---|---|---|---|---|---|
| Example 2 | VICTREX® PES4100P 100 | Cefral lube® IP 33 | ECONOL® E101S 33 | 30–60 | Nearly uniform | 21 | 210 | 0.11 | 1.3 | 4,800 | 5,200 |
| Comparative Example 2 | VICTREX® PES4100P 100 | Fluon® L169J 33 | ECONOL® E101S 33 | 120–180 | White spots marked | 17 | 208 | 0.15 | 3.7 | 7,100 | 7,500 |

TABLE 3

| | Aromatic polysulfone resin (parts by wt.) | Fluorocarbon polymer (parts by wt.) | Glass fiber (parts by wt.) | Dispersibility of fluorocarbon polymer Diameter of dispersed particle (μm) | Appearance of molded product | Mechanical properties | | Heat distortion temperature (°C.) | Moldability and heat stability in molten state Melt viscosity | |
|---|---|---|---|---|---|---|---|---|---|---|
| | | | | | | Tensile strength (kg/cm²) | Izod impact strength (kg·cm/cm) | | After residence for 5 min. (poises) | After residence for 30 min. (poises) |
| Example 3 | VICTREX® PES3600P 100 | Cefral lube® I 17 | CS03 MAPX 1 50 | 3 or below | Nearly uniform | 1,370 | 43 | 213 | 2,100 | 2,400 |
| Comparative Example 3 | VICTREX® PES3600P 100 | Fluon® L169J 17 | CS03 MAPX 1 50 | 50–150 | White spots marked | 1,250 | 34 | 212 | 3,300 | 3,500 |

TABLE 4

| | Aromatic polysulfone resin (parts by wt.) | Fluorocarbon polymer (parts by wt.) | Glass fiber (parts by wt.) | Dispersibility of fluorocarbon polymer Diameter of dispersed particle (μm) | Mold release property from mold Mold release resistance (%) | Tensile strength (kg/cm²) | Heat distortion temperature (°C.) |
|---|---|---|---|---|---|---|---|
| Example 4 | VICTREX® PES3600P 100 | Cefral lube® I 0.5 | CS03 MAXP 1 25 | 2 or below | 88 | 1,290 | 213 |
| Example 5 | VICTREX® PES3600P 100 | Cefral lube® I 1.0 | CS03 MAXP 1 25 | 2 or below | 67 | 1,290 | 212 |
| Comparative Example 4 | VICTREX® PES3600P 100 | — | CS03 MAXP 1 25 | — | 100 | 1,250 | 212 |
| Comparative Example 5 | VICTREX® PES3600P 100 | Cefral lube® I 0.1 | CS03 MAXP 1 25 | 2 or below | 98 | 1,260 | 212 |

What is claimed is:

1. An aromatic polysulfone resin composition improved in dispersibility of fluorocarbon polymer which comprises 0.3 to 50 parts by weight of a low molecular weight fluorocarbon polymer fluorinated up to its molecular end, having a flow temperature of 350° C. or lower as measured by the method mentioned below and 100 parts by weight of an aromatic polysulfone resin:

Flow temperature: A temperature at which melt viscosity reaches 48,000 poises when a molten sample is extruded from a nozzle (1 mm in inner diameter and 10 mm in length) of a capillary rheometer under a load of 100 kg/cm² at a temperature elevation speed of 4° C./minute.

2. An aromatic polysulfone resin composition according to claim 1, wherein the aromatic polysulfone resin has at least one recurring structural unit selected from the following recurring structural units (1) to (4):

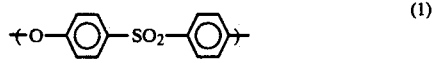 (1)

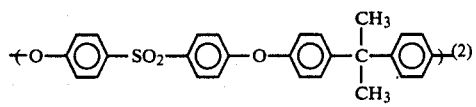 (2)

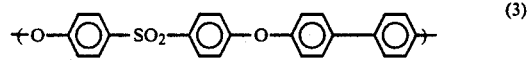 (3)

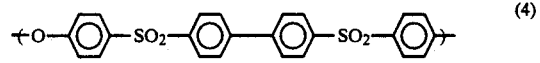 (4)

3. An aromatic polysulfone resin composition according to claim 1, wherein the aromatic polysulfone resin has the following recurring structural unit;

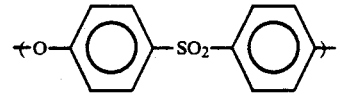

4. An aromatic polysulfone resin composition according to claim 1, wherein the fluorocarbon polymer is at least one member selected from the group consisting of polytetrafluoroethylene, tetrafluoroethylene-hexafluoropropylene copolymer, polytrichlorofluoroethylene and tetrafluoroethylene-perfluoroalkyl vinyl ether copolymer.

5. An aromatic polysulfone resin composition according to claim 1, wherein the fluorocarbon polymer is polytetrafluoroethylene.

* * * * *